United States Patent [19]

Yagi et al.

[11] Patent Number: 4,719,821
[45] Date of Patent: Jan. 19, 1988

[54] CREEP PREVENTIVE ARRANGEMENT IN AUTOMATIC TRANSMISSION

[75] Inventors: Youichi Yagi; Yoshiro Morimoto, both of Yokosuka, Japan

[73] Assignee: Nissan Motor Co., Ltd., Yokohama, Japan

[21] Appl. No.: 683,453

[22] Filed: Dec. 19, 1984

[30] Foreign Application Priority Data

Dec. 20, 1983 [JP] Japan .................. 58-238738
Oct. 8, 1984 [JP] Japan .................. 59-209911

[51] Int. Cl.⁴ .................. B60K 41/22; B60K 41/28; F16D 47/02; F16D 43/284
[52] U.S. Cl. .................. 74/869; 74/867; 192/0.076; 192/3.33; 192/105 F
[58] Field of Search .................. 74/752 C, 752 E, 863, 74/864, 865, 867, 868, 869; 192/103 FA, 103 F, 106 F, 85 F, 0.076, 3.33, 105 F

[56] References Cited

U.S. PATENT DOCUMENTS

| | | | |
|---|---|---|---|
| 2,633,760 | 4/1953 | Kelley | 74/752 C |
| 3,282,385 | 1/1966 | Snyder | 192/103 FA |
| 3,534,840 | 10/1970 | Snoy | 192/103 FA |
| 3,819,020 | 6/1974 | Smith | 192/103 FA |
| 3,890,856 | 6/1975 | Miyauchi et al. | 74/867 X |
| 3,978,743 | 9/1976 | Murakami | 74/869 |
| 4,261,455 | 4/1981 | Vitenbroek et al. | 192/106 F |
| 4,271,951 | 6/1981 | Nishimura et al. | 192/106 F |
| 4,318,311 | 3/1982 | Ross | 74/752 C |
| 4,513,639 | 4/1985 | Hiramatsu | 74/867 X |
| 4,561,328 | 12/1985 | Hiramatsu | 74/867 X |

FOREIGN PATENT DOCUMENTS

| | | |
|---|---|---|
| 2545798 | 4/1977 | Fed. Rep. of Germany . |
| 2027069 | 6/1978 | Fed. Rep. of Germany ...... 192/103 FA |
| 2833641 | 2/1980 | Fed. Rep. of Germany . |
| 39348 | 4/1981 | Japan .................. 74/865 |
| 13248 | 1/1983 | Japan .................. 74/865 |
| 128552 | 8/1983 | Japan .................. 74/865 |
| 23147 | 2/1984 | Japan .................. 74/865 |
| 187141 | 10/1984 | Japan .................. 74/867 |

Primary Examiner—Rodney H. Bonck
Assistant Examiner—David A. Testardi
Attorney, Agent, or Firm—Schwartz, Jeffery, Schwaab, Mack, Blumenthal & Evans

[57] ABSTRACT

A creep preventive arrangement wherein a start-up pressure regulating valve discharges fluid from a servo chamber of a start-up clutch when a clutch piston assumes a predetermined creep preventive position, and a start-up detecting valve prohibits the fluid discharge from the servo chamber when a torque converter output revolution speed exceeds a predetermined value.

31 Claims, 19 Drawing Figures

CREEP PREVENTIVE ARRANGEMENT IN AUTOMATIC TRANSMISSION

BACKGROUND OF THE INVENTION

The present invention relates to a creep preventive arrangement for an automatic transmission.

Automatic transmissions usually comprise a torque converter and a planetary change speed mechanism. In such a transmission, when a start-up range, i.e., a "D" range (forward automatic drive range) or a "R" (reverse drive range), a friction element corresponding to the range (i.e., a rear clutch corresponding to the D range and a front clutch corresponding to the R range) is hydraulically operated to cause the planetary change speed mechanism to assume a first forward gear ratio or a reverse drive, and when in this state, the engine speed is elevated, the engine revolution speed is delivered via the torque converter, the friction element and the planetary change speed mechanism to driving wheels of a vehicle.

Since the power delivery path is established when the transmission is set to D or R range even if the engine is idling, a so-called "creep" phenomeona wherein a vehicle tends to creep when the D range or R range is selected when the vehicle is at a standstill. One measure is to set a select lever to "N" (neutral) when the vehicle is at a standstill so as to render the above mentioned friction element inoperable to interrupt power transmission. However, this inevitably requires a troublesome manipulation of the selector lever every time when the vehicle comes to a halt. Besides, substantial shocks are produced whenever the shift is made from N to D or R, thus causing dicomfort of a driver.

Another measure to prevent the vehicle from creeping is to apply a brake. With this measure, a torque converter is kept at a so called "stall" state where an output element (a turbine runner) is held stationary while an input element (a pump impeller) is driven by an engine, imposing load on the engine even when the vehicle is at a standstill. In order to prevent the engine from stalling under this condition, the engine has to increase its idle speed to maintain its idling operation, thus requiring additional fuel. This explains why a vehicle with an automatic transmission is poor in fuel economy as compared to a vehicle with a manual transmission.

SUMMARY OF THE INVENTION

An object of the present invention is to provide a creep preventive arrangement which prevents the occurrence of creep of a vehicle and provides smooth start-up of the vehicle.

According to the present invention, there is provided a creep preventive arrangement for an automatic transmission having a torque converter including an output rotatable at a torque converter output revolution speed, comprising:

a friction element having a member rotatable with the output of the torque converter and a fluid chamber, said member being movable responsive to fluid pressure in said fluid chamber from a released position to a firmly engaged position past through a predetermined creep preventive position as the fluid pressure in said fluid chamber increases;

a start-up pressure regulating means for discharging fluid from said fluid chamber to cause a drop in the fluid pressure in said fluid chamber when said member has moved to said predetermined creep preventive position so as to prevent further increase in the fluid pressure in said fluid chamber; and means responsive to the torque converter output revolution speed for prohibiting said start-up pressure regulating means for discharging fluid from said fluid chamber when the torque converter output revolution speed exceeds a predetermined value thereby to permit further increase in the fluid pressure in said fluid chamber to urge said member to move beyond said predetermined creep preventive position to said firmly engaged position.

DESCRIPTION OF THE EMBODIMENTS

The present invention is specifically described hereinafter in connection with the illustrated embodiments.

Figure 1:
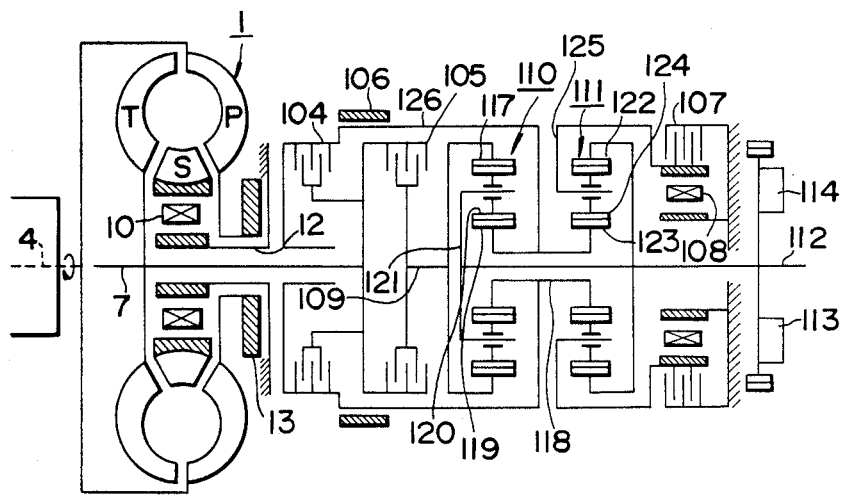
FIG. 1 is a schematic view of a power transmitting part of an automatic transmission incorporating a creep preventive arrangement according to the present invention.

FIG. 1 shows in schematic a power transmitting part within a three forward speed one reverse speed automatic transmission. It comprises a torque converter 1 driven by a crankshaft 4 of an engine, an input shaft 7, a front clutch 104, a rear clutch 105, a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller P, a turbine runner T, and a stator S. The pump impeller P is driven by the crankshaft 4 to rotate working oil therein so as to transmit a torque to the turbine runner T fixed to the input shaft 7. This torque is transmitted by the input shaft 7 to a change speed gear train. The stator S is disposed on a sleeve 12 via a one-way clutch 10. The one-way clutch 10 allows the stator S to rotate in the same direction as the crankshaft 4, that is, in the direction indicated by an arrow in FIG. 1 (this rotation is referred to as forward rotation hereinafter), but prevents it from rotating in the reverse direction (this rotation is referred to as reverse rotation hereinafter). The first planetary gear unit 110 comprises an internally toothed gear 117 fixed to the intermediate shaft 109, a sun gear 119 fixed to a hollow transmitting shaft 118, and at least two planetary pinions 120 meshing with the internally toothed gear 117 and sun gear 119, which pinions 120 are capable of orbiting around the sun gear 119 while revolving about their axes, and a planetary pinion carrier 121 supporting the planetary pinions 120 which carrier 121 is fixed to an output shaft 112. The second planetary gear unit 111 comprises an internally toothed gear 122 fixed to the output shaft 112, a sun gear 123 fixed to the hollow transmitting shaft 118, and at least two planetary pinions 124 meshing with the internally toothed gear 122 and sun gear 123, which pinions 124 are capable of orbiting around the sun gear 123 while revolving about their axes, and a planetary pinion carrier 125 for supporting the planetary pinions 124. The front clutch 104 is operative to connect the input shaft 7, driven by the turbine runner T, to the hollow transmitting shaft 118, which is integrally rotatable with both sun gears 119 and 123, via a drum 126, whereas the rear clutch 105 is operative to connect the input shaft 7 to the internally toothed gear 117 of the first planetary gear unit 110 via the intermediate shaft 109. The second brake 106 is operative to anchor both sun gears 119 and 123 by gripping the drum 126 fixed to the hollow transmitting shaft 118, whereas the low reverse brake 107 is operative to anchor the pinion carrier 125 of the second planetary gear unit 111. The one-way brake 108 allows forward rotation of the pinion carrier 125, but prevents reverse rotation thereof. The first and second governor valves 113 and 114 are operatively connected to the output shaft 112 and produce a governor pressure in response to the vehicle speed.

Now, power delivery paths to be established during operation when a manual speed selector lever is set to a D position (forward drive range) will be explained.

In this case, only the rear clutch 105 which serves as a forward input clutch is engaged. A torque delivered from an engine via the torque converter 1 is transmitted via the input shaft 7 and rear clutch 105 to the internally toothed gear 117 of the first planetary gear unit 110. The internally toothed gear 117 causes the planetary pinions 120 to rotate in the forward direction. This causes the sun gear 119 to rotate in the reverse direction, and, since the sun gear 123 of the second planetary gear unit 111 which is rotatable with the sun gear 119 rotates in the reverse direction, the planetary pinions 124 of the second planetary gear unit 111 rotates in the forward direction. The one-way brake 108 acts as a forward reaction brake to prevent the sun gear 123 from rotating the pinion carrier 125 in the reverse direction, thus causing the internally toothed gear 122 of the second planetary gear unit 111 to rotate in the forward direction. Accordingly, the output shaft 112 which is rotatable with the internally toothed gear 122 rotates in the forward direction at a reduction ratio for the first forward speed. When, in this state, the vehicle speed increases and the second brake 106 is applied, the power from the input shaft 7 and past rear clutch 105 is transmitted to the internally toothed gear 117 is the same as in the counterpart for the first forward speed. The second brake 106 acts as a forward reaction brake to anchor the drum 126, thus preventing the rotation of the sun gear 119. This causes the planetary pinions 120 to rotate about their axes and orbit around the anchored sun gear 119, and accordingly the pinion carrier 121 and output shaft 112, which is rotatable with the pinion carrier 121, rotate in the forward direction at a speed which is faster than the speed of the output shaft 112 at the first speed although it is reduced as compared to the input shaftspeed, thus estasblishing a reduction ratio for the second forward speed.

As the vehicle speed further increases and when the second brake 106 is released and, in lieu thereof, the front clutch 104 is engaged, a portion of the power transmitted to the input shaft 7 is transmitted through the rear clutch 105 to the internally toothed gear 117, while the balance is transmitted through the front clutch 104 to the sun gear 119. Thus, the internally toothed gear 117 and sun gear 119 are interlocked and rotate in the forward direction, as a unit, together with both the pinion carrier 121 and output shaft 112 at the same speed, thus establishing the third forward speed. In the case, the front clutch 104 and rear clutch 105 serve as an input clutch and the torque mutiplication is not carried out in the planetary gears, so that none acts as a reaction brake.

Now, a power delivery path when the speed selector lever is set to R position (reverse drive) is explained.

In this case, the front clutch 104 and low reverse brake 107 are applied, the power from the engine and past through the torque converter 1 is delivered from the the input shaft 7 to the sun gears 119 and 123 via the front clutch 104 and drum 126. The rear pinion carrier 125 is held stationary by the low reverse brake 107, so that the above mentioned forward rotation of the sun gears 119 and 123 causes the internal gear 112 to rotate at a reduced speed in the reverse direction and a reduction ratio for the reverse drive is given by the output shaft 112 which is rotatable with the internally foothed gear 122.

Figure 2A:
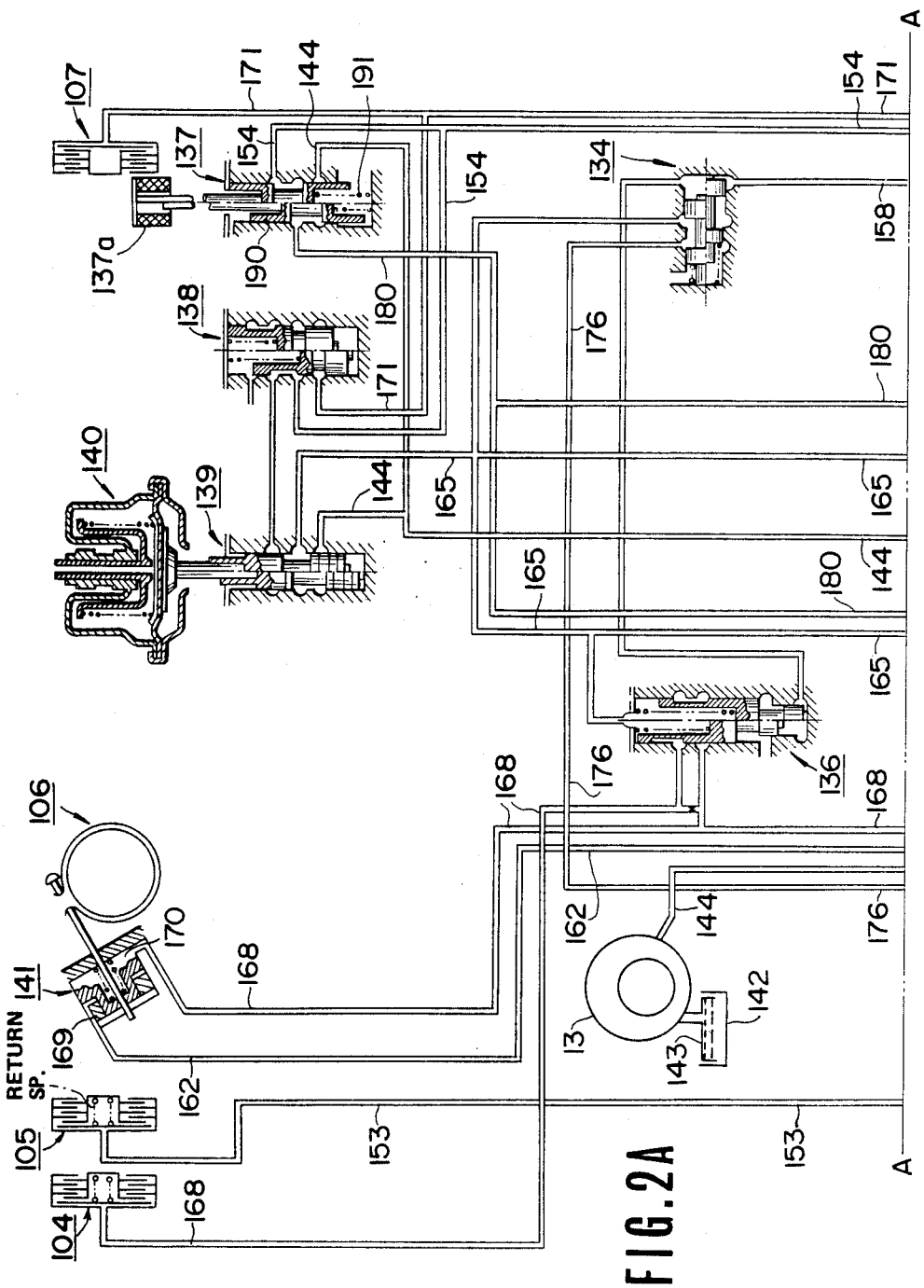
FIGS. 2A and 2B, when combined, provide a schematic view of a hydraulic control system of the automatic transmission.
Figure 2B:
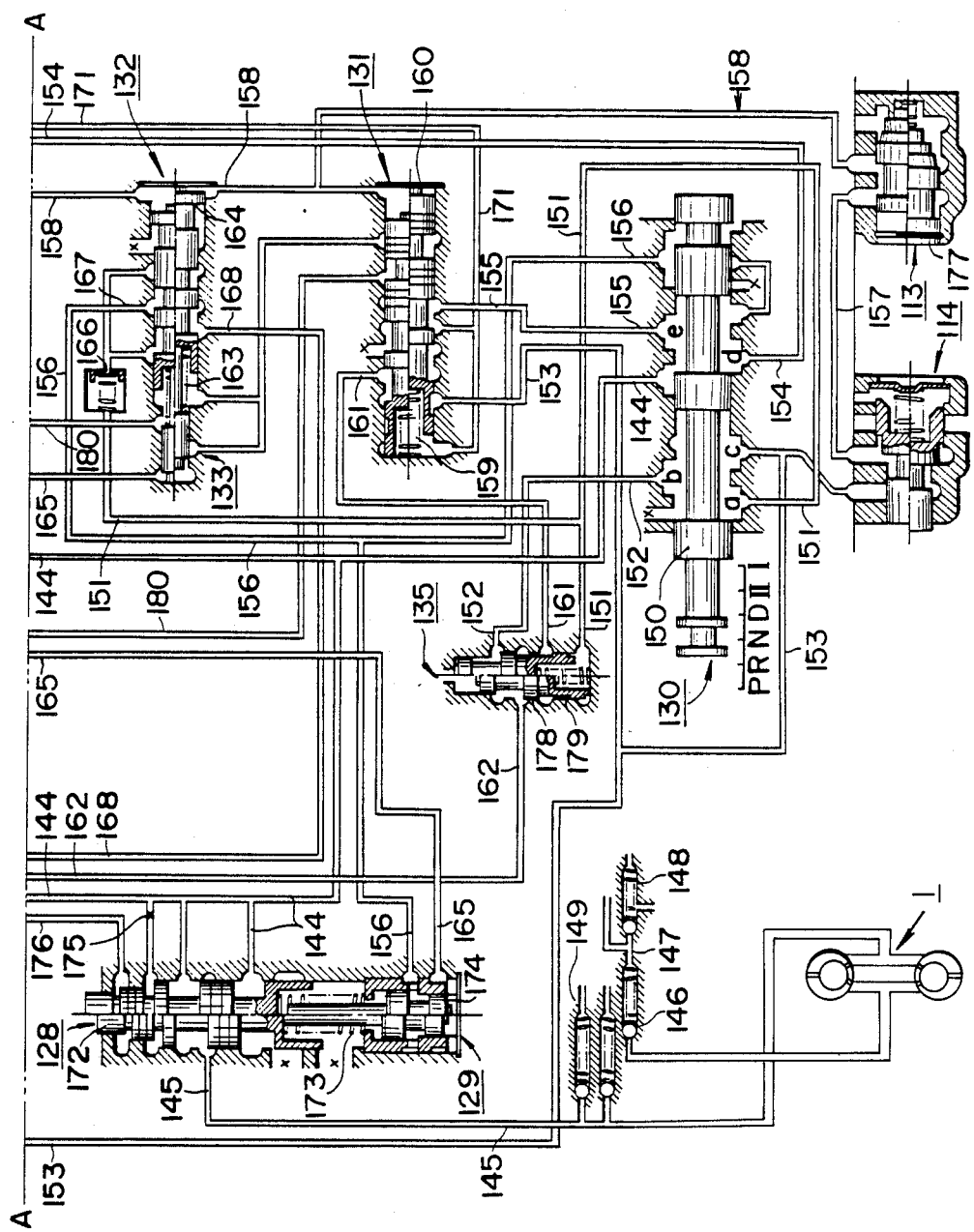

FIG. 2 shows a hydraulic control system of a shift control unit for the above-described change speed transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and hydraulic pressure network. The hydraulic fluid or oil pump 13 is driven by a prime mover via the driving shaft 4 and the pump impeller P of the torque converter 1 and draws hydraulic fluid from a reservoir 142 through a strainer 143, where harmful dust is removed, during all operating conditions of the prime mover so as to deliver the oil to a line pressure circuit 144.

The hydraulic fluid is regulated by the line pressure regulator valve 128 and the thus regulated hydraulic fluid is delivered to the torque converter 1 and the speed selector valve 130. The line pressure regulator valve 128 comprises a spool 172 and a spring 173, in which, in addition to a bias by the spring 173, the throttle pressure in a circuit 165 and the line pressure in a circuit 156 act on the spool 172 via a spool 174 of the pressure booster valve 129 and these forces are applied to the spool 172 against the line pressure applied from a circuit 144 via an orifice 175 and the pressure from a circuit 176 both acting on upper areas of the spool 172.

The hydraulic pressure in the torque converter 1 is maintained within a certain pressure range by a pressure maintaining valve 146 as long as the oil having admitted to a corcuit 146 is discharged via a discharge passage 51 and the pressure maintaining valve 146 after passage through the torque converter 1 from a feed passage 50. When the pressure exceeds a certain level, the pressure maintaining valve 146 opens to permit the hydraulic fluid to flow into a circuit 147 toward the rear lubricating section of the power transmitting mechanism. When this lubricant pressure is too high, a relief valve 148 opens to bring down a pressure. On the other hand, the lubricant from the circuit 145 is supplied via a front lubrication valve 149 to the front lubricating section of the power transmitting mechanism. The speed selector valve 130 is a liquid direction switching valve manually operable by the selector valve (not shown) and it comprises a spool 150, and is connected to a speed selector lever (not shown) through a linkage so that manipulating the speed selector lever into any desired one of the positions causes the spool 150 to change the passage of the line pressure circuit 144. FIG. 2 shows a state of the speed selector valve 130 when the spool assumes N (neutral) position, wherein the line pressure circuit 144 is permitted to communicate with the two ports d and e. The first and second governor valves 113 and 114 produce a governor pressure while the automobile travels in the forward direction and causes the governor pressure to actuate the 1-2 shift valve 131 and the 2-3 shift valve 132 for effecting an automatic shifting and also to affect the line pressure. When the speed selector valve 130 assumes either D, II or I position, the hydraulic pressure is fed from the line pressure circuit 144 to the second governor valve 114 through the port c of the speed selector valve 130. If, under this condition, the automobile begins to move, the governor pressure regulated by the second governor valve 114 is delivered to a circuit 157 leading to the first governor valve 113, and subsequently when the vehicle speed reaches a predetermined value, the spool 177 of the first governor valve 113 moves to a position wherein the circuit 157 communicates with a circuit 158, admitting the governor pressure thereto. From the circuit 158, the governor pressure acts on the respective end surfaces of the 1-2 shift valve 131, 2-3 shift valve and cut-down valve 134 against the respective springs which urge these valves to the right as viewed in the Figure so as to balance with the corresponding spring forces.

In a hydraulic pressure circuit leading from the port c of the speed selector valve 130 through a circuit 153, a circuit 161 and a circuit 162, up to an apply side hydraulic pressure chamber 169 of a servo 141 for gripping the second brake 106, the 1-2 shift valve 131 and second lock valve 135 are separately arranged, and a circuit 152 leads from the port b of the speed selector valve 130 to the second lock valve 135.

If the speed selector lever is set to D position, the spool 150 of the speed selector valve 130 is moved to a position providing communication between the line pressure circuit 144 and ports a, b and c. From the port a, the hydraulic fluid pressure passes through the circuit 151 to the second lock valve 135 to act on the lower end thereof, thereby to prevent the interruption of the communication between the circuits 161 and 162 which are permitted to communicate with each other when the spool 178 which is urged upward by a spring 179 is pressed down by the oil pressure acting thereon via the circuit 152 from the port b. The hydraulic pressure at the port a is delivered via an orifice 166 and a circuit 167 also to the 2-3 shift valve 132. The hydraulic pressure at the port c is transmitted through a circuit 153 to the second governor valve 114, rear clutch 105, and 1-2 shift valve 131, thereby to establish the first forward speed. If, under this condition, the vehicle speed increases up to a certain value, the governor pressure in the circuit 158 urges the spool 160 to the 1-2 shift valve 131, which is urged to the right by the spring 159, to move to the left, thereby to effect an upshift from the first forward speed to the second forward speed, where the circuit 153 is permitted to communicate with the circuit 161, allowing hydraulic pressure to be delivered through the second lock valve 135 and circuit 162 to the apply side hydraulic pressure chamber 169 of the servo 141 to apply the second brake 106, thus establishing the second forward speed.

In this csae, since the 1-2 shift valve 131 is small-sized, it is assumed that the spool 160 moves to the left quickly before the vehicle speed rises further beyond the vehicle speed value at which a shifting from the first to second speed is to take place. If the vehicle speed further increases up to another certain value, the governor pressure in the circuit 158 urges the spool 164 of the 2-3 shift valve 132 to the left overcoming the spring 163, so that the circuit 167 is permitted to communicate with the circuit 168 delivering hydraulic pressure via the circuit 168 to the release-side hydraulic pressure chamber 170 of the servo 141 so as to release the second brake 106 and also to the front clutch 104 to engage same, thus establishing the third forward speed.

If the speed selector lever is set to the II position (manual second speed), the spool 150 of the speed selector valve 130 is moved to a position providing communication between the line pressure circuit 144 and the ports b, c and d. The hydraulic pressure at the port b is fed to the same place as in the case of D and the hydraulic pressure at the port c is fed to the rear clutch 105 to engage same. Because, under this condition, the hydraulic pressure does not act on the lower end of the second lock valve 135 and because the lower land has a larger area than the upper land, which lands form a space on the spool 178 opening to the circuit 152, the spool 178 of the second lock valve 135 is pushed downward against the force of the spring 178, assuming a position in which the circuit 152 is permitted to communicate with the circuit 162, permitting the hydraulic pressure to reach the apply side hydraulic pressure chamber 169 of the servo 141 so as to effect application of the second brake 106, thereby establishing the second forward speed. The hydraulic pressure at the port d is delivered via the circuit 154 to the solenoid down shift valve 137 and also to the throttle back-up valve 138. Since the communication between the line pressure circuit 144 leading to the speed selector valve 130 and the port a thereof is prevented, the hydraulic pressure does not pass through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is set to I position (manual first forward speed), the line pressure circuit 144 is permitted to communicate with the ports c, d and e. The hydraulic pressure at the port c is delivered to the rear clutch 105 to effect clutch engagement and the hydraulic pressure at the port d is delivered to the same places as in the case of II, whereas the hydraulic pressure at the port e is delivered via the circuit 155, 1-2 shift valve 131 and the circuit 171 to the low-reverse brake 107 so as to apply the low reverse brake 107 which, when applied, acts as a forward reaction brake, thus conditioning the transmission in the first forward speed. The hydraulic pressure at the port e is delivered also to the left end of the 1-2 shift valve 131, pushing the spool 160 to the right in cooperation with the spring 159, thus locking the transmission in the first forward speed.

If a driver depresses an accelerator pedal deeply till the full throttle opening position during running with D position so as to demand a large acceleration as desired, a kickdown switch is switched ON and a downshift solenoid 137a of the solenoid downshift valve 137 is energized because electric current passes therethrough. The energization of the solenoid 137a causes a spool 190 of the solenoid downshift valve 137 to move from a spring set position by a spring 191 downward. In this now position, a kickdown circuit 180 is allowed to communicate with the line pressure circuit 144, thus admitting the line pressure to the 1-2 shift valve 131 and the 2-3 shift valve 132 via the circuit 144 and the circuit 180, urging these valves against the governor pressure. Assuming now that the vehicle is traveling with the third speed when the solenoid 137a is energized, a spool 164 of the 2-3 shift valve is forcibly pushed to move from the leftward position to the rightward position against the governor pressure owing to the line pressure, effecting a forced downshift from the third speed to the second speed as long as the vehicle speed is lower than an upper limit value, thus providing a sufficiently large acceleration. Assuming that the vehicle is travelling with the second speed when the above mentioned kickdown is carried out, the line pressure admitted to the kickdown circuit 180 can push a spool 160 of the 1-2 shift valve 131 also from the leftward position to the right against the governor pressure because in this travelling condition, a heavy load is applied and vehicle speed is low. Therefore, a forced downshift from the second speed to the first speed takes place, providing a larger acceleration matching with the heavy load.

Figure 3:
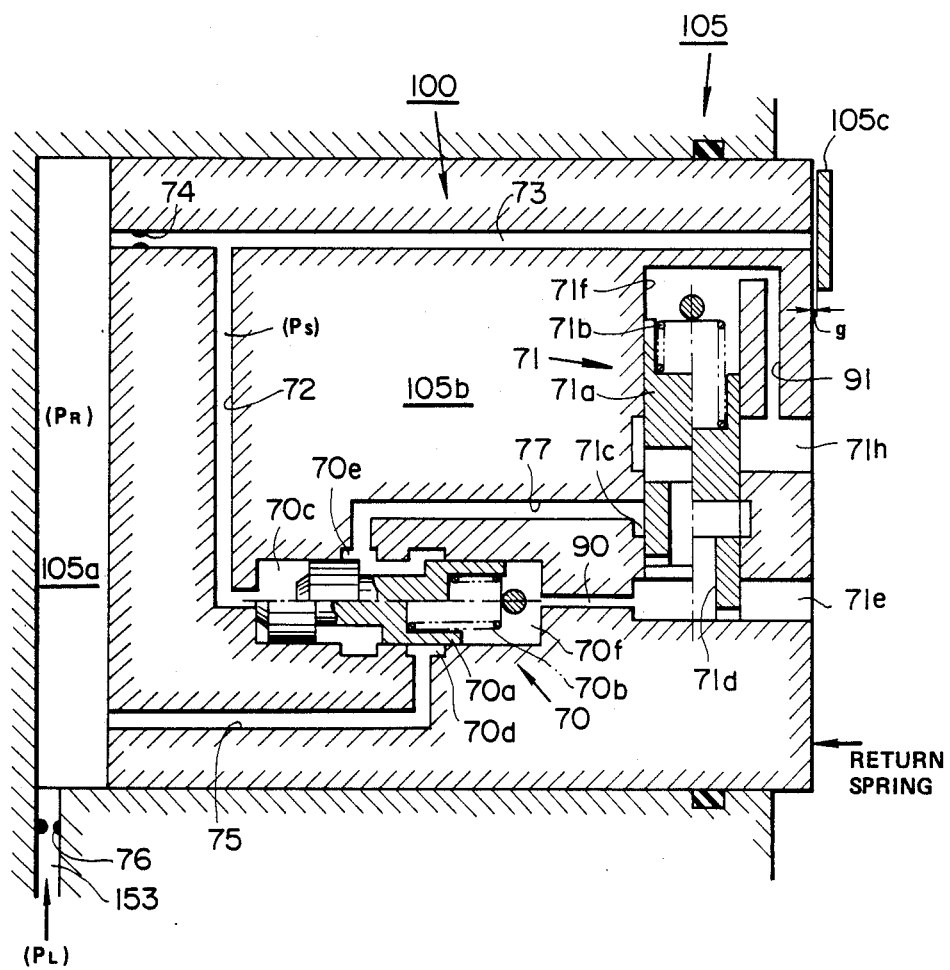
FIG. 3 is a fragmentary sectional diagram of a rear clutch illustrating a first embodiment of the present invention.

Referring to FIG. 3, a creep preventive arrangement according to invention is described. This arrangement includes a valvular circuit 100 built in the rear clutch 105 as illustrated. Describing the operation when the selector valve 130 is moved to D range with an intention to start up the vehicle, the rear clutch 105 is supplied with the line pressure $P_L$. The supply of line pressure $P_L$ causes a rear clutch pressure (start-up pressure) $P_R$ to build up in a chamber 105a. The rear clutch pressure $P_R$ developed cause a clutch piston 105b to move to right as viewed in FIG. 3, causing the clutch piston 105b to interengage clutch plates 105c, one of which is shown for illustration purposes only. Upon the engagement, the rear clutch 105 establishes a driving connection between the input shaft 7 and the intermediate shaft 109 (see FIG. 1), thereby establishing the first reduction ratio as described before.

In the embodiment according to present invention, a start-up pressure regulating valve 70 and a start-up detecting valve 71 are built in a driven component of the rear clutch 105, i.e., the clutch piston 105b, which is always driven via the input shaft 7 by the torque converter 1.

The start-up pressure regulating valve 70 is arranged axially parallel to a rotation axis about which the clutch piston 105b turns so that rotation of the clutch piston 105b does not have any influence on operation of the start-up pressure regulating valve 70. The axis of rotation extends from left to right as viewed in FIG. 3 and is disposed below the clutch piston 105b although not shown in FIG. 3. The start-up pressure regulating valve 70 comprises a spool 70a and a spring 70b biasing this spool toward a rest position as illustrated by a lower half portion thereof. The spool 70a assumes a balanced position when a right directed force, as viewed in FIG. 3, due to the control pressure $P_S$ within a chamber 70c balances with a left directed force due to the spring 70b. When it assumes an upper half illustrated position, a communication between the ports 70d and 70e is established, while when it assumes a bottom half illustrated position, this communication is blocked. In order to introduce the control pressure $P_S$ into the chamber 70c, a circuit 72 is formed through the clutch piston 105b. The circuit 72 is connected with a connecting hole 73 formed through the clutch piston 105b. The connecting hole 73 has one end provided with an orifice 74 and opens to the chamber 105a. An opposite end of the connecting hole 73 is open at a frictional surface of the clutch piston 105b which is frictionally engaged with the clutch plates 105c. This connecting hole 73 causes the build-up of the control pressure $P_S$, within the connecting hole 73 and thus the chamber 70c, which is variable responsive to a clearance g created between the clutch piston 105b and the clutch plate 105c disposed adjacent to the clutch piston 105b. The clutch piston 105b is further formed with a circuit 75 which connects port 70d with the chamber 105a. The circuit 153 which is open to the chamber 105a is provided with an orifice 76. The setting of the orifice 76 is such that the line pressure $P_L$ within the circuit 153 is maintained even when the rear clutch pressure $P_R$ is discharged in the case which is later described. The setting of the other orifice 74 is such that the rear clutch pressure $P_R$ is maintained even when the clearance g becomes large enough to cause the control pressure $P_S$ to become zero. Designated by the reference numeral 90 is an oil conduit via which oil spilled over into a chamber 70f is conveyed to a drain port 71e, thus securing smooth movement of the spool 70a.

The start-up detecting valve 71 is arranged radially along a radial direction extending perpendicular to the rotation axis about which the clutch piston 105b turns such that the start-up detecting valve 71 is operable responsive to a centrifugal force due to the rotation of the clutch piston 105b, i.e., a revolution speed of the turbine runner of the torque converter 1. The start-up detecting valve 71 comprises a spool 71a and a spring 71b biasing the spool 71a to a position illustrated by the right half thereof. The spool 71a displaces to a position where an upward force, as viewed in FIG. 3, due to the centrifugal force balances with a downward force. When it assumes a position indicated by a right half thereof, a port 71c is allowed to communicate via a through bore 71d formed through the spool 71a with the drain port 71e, while when it assumes a position illustrated by a left half portion thereof, this communication is shut off. The port 71c is connected via a circuit 77 with the port 70e of the start-up pressure regulating valve 70. The drain port 71e is open within that end of the clutch piston 105b which is near the clutch plate 105c. The arrangement of the drain port 71e is near the rotation axis as compared to the surface portion frictionally engageable with the clutch plate 105c. With this arrangement, drain oil discharged from the drain port 71e is brought radially outwardly toward the clutch plates 105c owing to the centrifugal force, thus improving lubrication of the friction surfaces of the clutch plates 105c. Designated by the reference numeral 91 is an oil conduit via which oil within the chamber 71f is drained toward a port 71h, thus securing smooth movement of the spool 71a.

The operation of the above mentioned embodiment is described. When the manual selector valve 130 is moved to "D" range at the vehicle being at a standstill, the line pressure $P_L$ is generated in the circuit 153, thus causing the rear clutch pressure (operating pressure) $P_R$ to build up within the chamber 105a of the rear clutch 105. When the engine operates at an idle speed, for example, 750 rpm, with an accelerator pedal released by a driver, the rotation of the engine causes the clutch piston 105b to rotate about the rotation axis (not shown) at a speed substantially equal to the idle speed. Strictly speaking, the rotation speed of the clutch piston 105b at engine idling is slightly lower than the idle speed because of slip within the torque converter 1 and the clutch piston 105b rotates at approximately 700 rpm when the engine idle speed is about 750 rpm. Although the rotation of the clutch piston 105b causes generation of a centrifugal force, urging the spool 71a of the start-up detecting valve 71 upward, as viewed in FIG. 3, against the force of the spring 71b, the spool 71a remains in the spring set position as illustrated by the right half thereof because the force of the spring 71b is set strong enough to oppose the centrifugal force. Thus, the spool 71a permits the port 71c to communicate with the drain port 71e, rendering the circuit 77 to serve as a drain circuit.

Figure 4A:
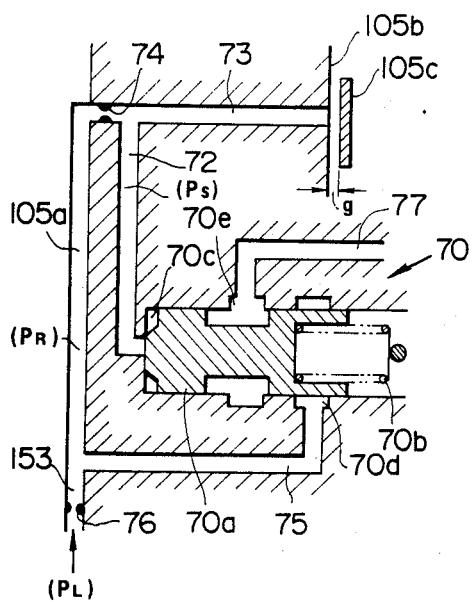
FIGS. 4(A), 4(B), 4(C) and 4(D) are diagrams illustrating various operative positions assumed by the first embodiment.

Describing how the start-up pressure regulating valve 70 works when the manual selector valve 103 is moved to "D" range, the control pressure $P_S$ is initially zero because all oil within the circuit 73 is drained via the clearance g because the clearance g is large as illustrated in FIG. 4(A) when the rear clutch 105 is disengaged where the clutch piston 105b assumes the position as illustrated in FIG. 3. Since the control pressure $P_S$ is zero, the spool 70a of the start-up pressure regulating valve 70 stays in the spring set position as illustrated by the lower half thereof owing to the force of the spring 70b. In this position, the start-up regulating valve 70 separates the circuit 75 from the circuit 77 which is drained. Therefore, the rear clutch pressure $P_R$ increases toward a level as high as the line pressure $P_L$. The increase in the rear clutch pressure $P_R$ causes rightward movement (as viewed in FIG. 3) of the clutch piston 105b, resulting in a decrease in the clearance g.

Figure 4B:
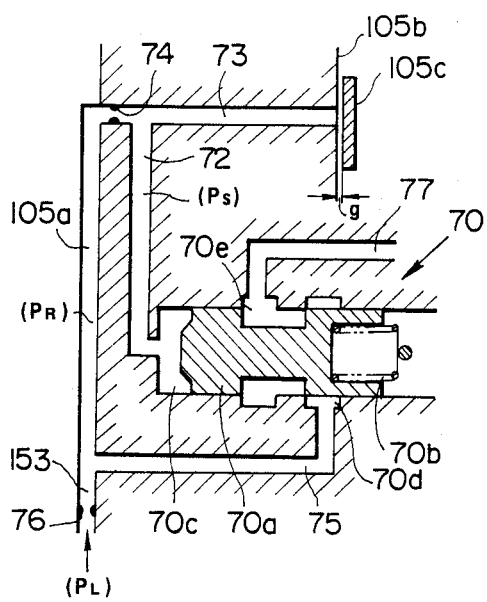
Figure 4C:
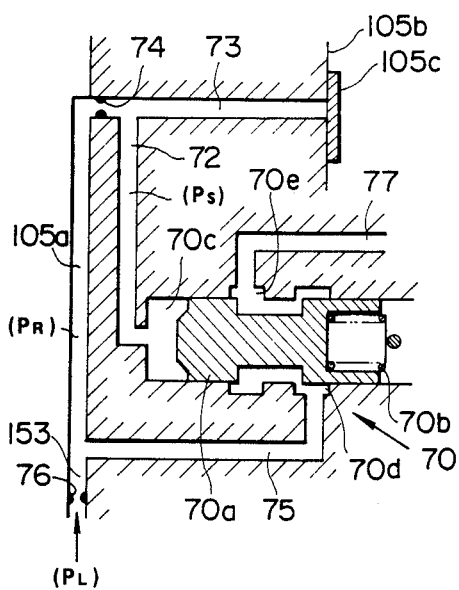

As the clearance g decreases as shown in FIG. 4(B), the control pressure $P_S$ increases, causing the spool 70a to move to the right until the clearance g becomes zero as shown in FIG. 4(C). In this position, the communication of the circuit 75 with the circuit 77 begins. This causes a portion of oil to be drained from the rear clutch chamber 105a via the circuits 75 and 77, preventing further increase in rear clutch pressure $P_R$ toward the line pressure $P_L$. Since the rear clutch pressure $P_R$ stays unchanged afterwards, the clutch piston 105b will not move beyond a point when the clearance g becomes zero and will not engage further with the clutch plate 105c.

After the above mentioned process, the rear clutch 105 is held in an about-to-engage state where the clutch is not engaged although the clearance g is zero, thus interrupting transmission of power, thus preventing creep. As a result, the vehicle is prevented from creeping forward from a standstill even when the manual selector valve 130 is moved to the "D" range, thus providing enhanced operability. Besides, since it is no more necessary to operate the engine at a relatively high idle speed, the engine idle speed can be set to a relatively low level, resulting in an improved fuel economy.

When the engine revolution speed increases from the idle speed as a result of depression of the accelerator pedal for vehicle start-up, the rotation of the clutch piston 105b increases, thus increasing the centrifugal force. When the revolution of the torque converter output, i.e., turbine runner, reaches a predetermined value of 900 rpm for example which is slightly higher than the idle speed thereof, i.e., 700 rpm, the centrifugal force becomes strong enough to displace the spool 71a upward from the position as illustrated by the right half thereof to the position illustrated by the left half thereof as viewed in FIG. 3, thus separating the circuit 77 from the drain port 71e. This causes the start-up pressure regulating valve 70 to cease its pressure regulating function because the drain path through which oil is drained from the chamber 105a is closed. Thus, the rear clutch pressure $P_R$ increases immediately to a level as high as the line pressure $P_L$. The increase of the rear clutch pressure $P_R$ causes the rear clutch piston 105b to move further to the right from the illustrated position in FIG. 4(C), urging the clutch plates 105c to firmly interengage, thus establishing a power delivery path through the rear clutch 105. Since the first reduction ratio is established by the engagement of the rear clutch 105, the increase in engine revolution speed causes the vehicle to move off from a standstill.

Figure 4D:
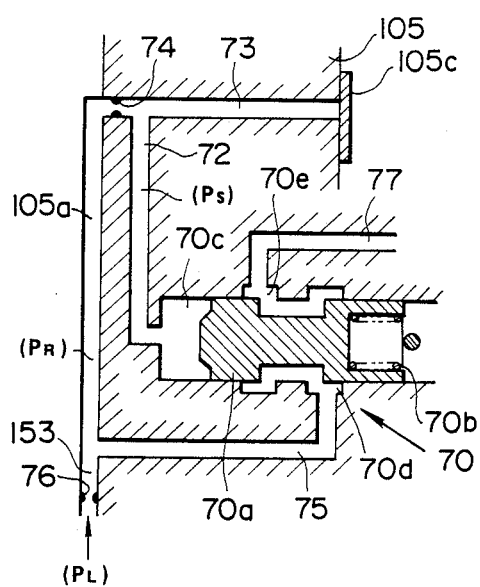

The above mentioned shift of the rear clutch 105 from the about-to-engage state as illustrated in FIG. 4(C) to the fully engaged state is made quickly without any delay because, in the illustrated about-to-engage state, the clearance g between the clutch piston 105b and the clutch plate 105b is kept zero, thus enabling the vehicle to move off from a standstill without any delay. After the rear clutch 105 has been engaged, since the clearance g is kept zero, the control pressure $P_S$ is as high as the line pressure $P_L$ to hold the spool 70a of the start-up pressure regulating valve 70 to the rightmost position thereof as illustrated in FIG. 4(D) against the spring 70b wherein the circuit 75 is permitted to communicate with the circuit 77. However, since the circuit 77 is isolated from the drain port 71e by the start-up pressure detecting valve 71, the rear clutch presure $P_R$ is kept as high as the line pressure $P_L$, thus assuring firm engagement of the rear clutch 105 during forward travel of the vehicle.

Figure 5:
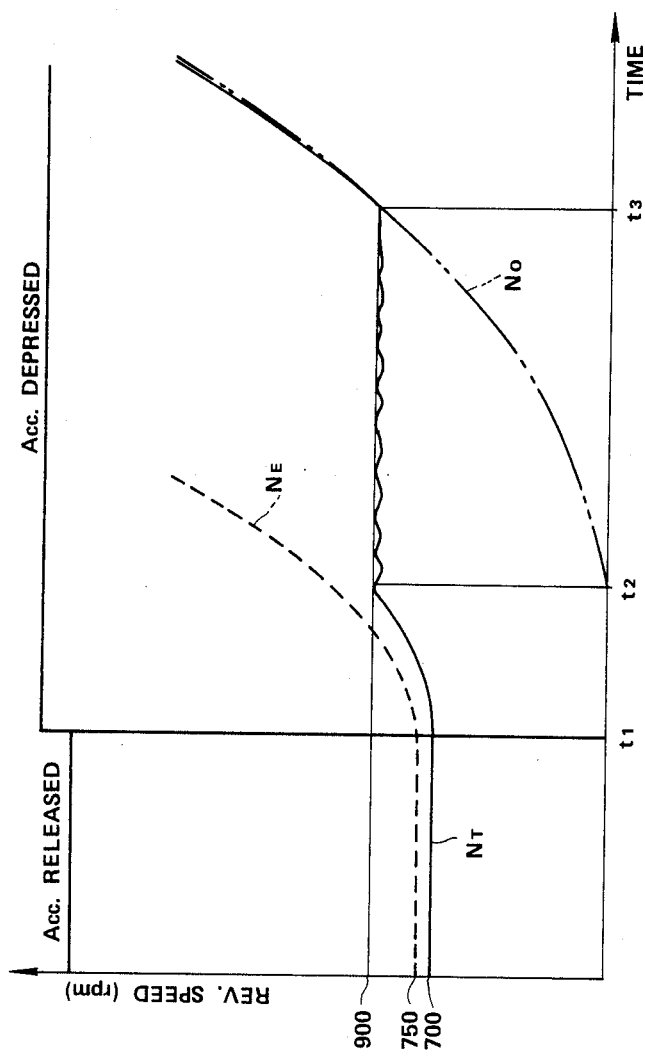
FIG. 5 is a time chart for the first embodiment.

Referring to FIG. 5, there are illustrated how an engine revolution speed $N_E$, a torque converter output revolution speed (turbine runner revolution speed) $N_T$ and a rear clutch output revolution speed $N_O$ vary when the accelerator is depressed for start-up of the vehicle. During engine idle operation taking place before an instant $t_1$ when the accelerator pedal is depressed, the torque converter output revolution speed $N_T$ is kept at 700 rpm which is lower than the engine idling speed $N_E$ (i.e., 750 rpm) by an amount corresponding to slip within the torque converter because the rear clutch 105 is kept in about-to-engage state. After the instant $t_1$, the accelerator pedal is depressed and thus the engine revolution speed $N_E$ rises as shown, the torque converter output revolution speed $N_T$ rises in the same manner until it reaches the predetermined level of 900 rpm. At an instant $t_2$ when the torque converter output revolution speed $N_T$ reaches 900 rpm, the engagement of the rear clutch 105 is initiated, thus applying a so-called "start-up load" to the torque converter 1. The torque converter output revolution speed $N_T$ drops below 900 rpm when the start-up load is applied. The drop in torque converter output revolution speed $N_T$ allows the start-up detecting valve 71 to drain a portion of oil from the chamber 105a to cause a drop in the rear clutch pressure $P_R$, thus allowing the rear clutch 105 to slip. This slip in the rear clutch 105 causes an increase in the torque converter output revolution speed, causing the start-up detecting valve 71 to suspend the drain from the rear clutch pressure $P_R$ again. Repeating this cycle of operation causes the rear clutch output revolution speed $N_O$ to rise from the instant $t_2$. Thereafter, the rear clutch output revolution speed $N_O$ gradually increase before it reaches as high as the torque converter output revolution speed $N_T$. The torque converter output revolution speed $N_T$ is kept around the predetermined level of 900 rpm during a time period from the instant $t_2$ to $t_3$. After the instant $t_3$ when the clutch output revolution speed $N_O$ reaches a level as high as the torque converter output revolution speed $N_T$, the start-up load decreases and $N_T$ and $N_O$ rise exactly same manner as illustrated in FIG. 5 because the torque converter output revolution speed $N_T$ is always above 900 rpm and thus the start-up detecting valve continue to isolate the circuit 77 from the drain port 71e and the rear clutch pressure $P_R$ is held as high as the line pressure $P_L$.

Although, in the above embodiment, the present invention has been embodied in association with the rear clutch 105 for preventing creep in D range, it may be embodied in association with the front clutch 104 for preventing creep in R range. In this case, a valvular circuit including a start-up pressure regulating valve 70 and a start-up detecting valve 71 is built in the front clutch 104 which is engaged when the manual selector valve 103 is moved to "R" range.

Although in the above examples described, the valves 70 and 71 are built in the rear clutch 105 or the front clutch 104, they may be arranged separately from the clutch piston. But, in this case, since the centrifugal force due to the rotation of the clutch piston can no longer be utilized to displace the spool of the start-up detecting valve, and thus one measure is to detent a torque converter output revolution speed in terms of electric signal and use a start-up detecting valve operable on the electric signal.

Figure 6:
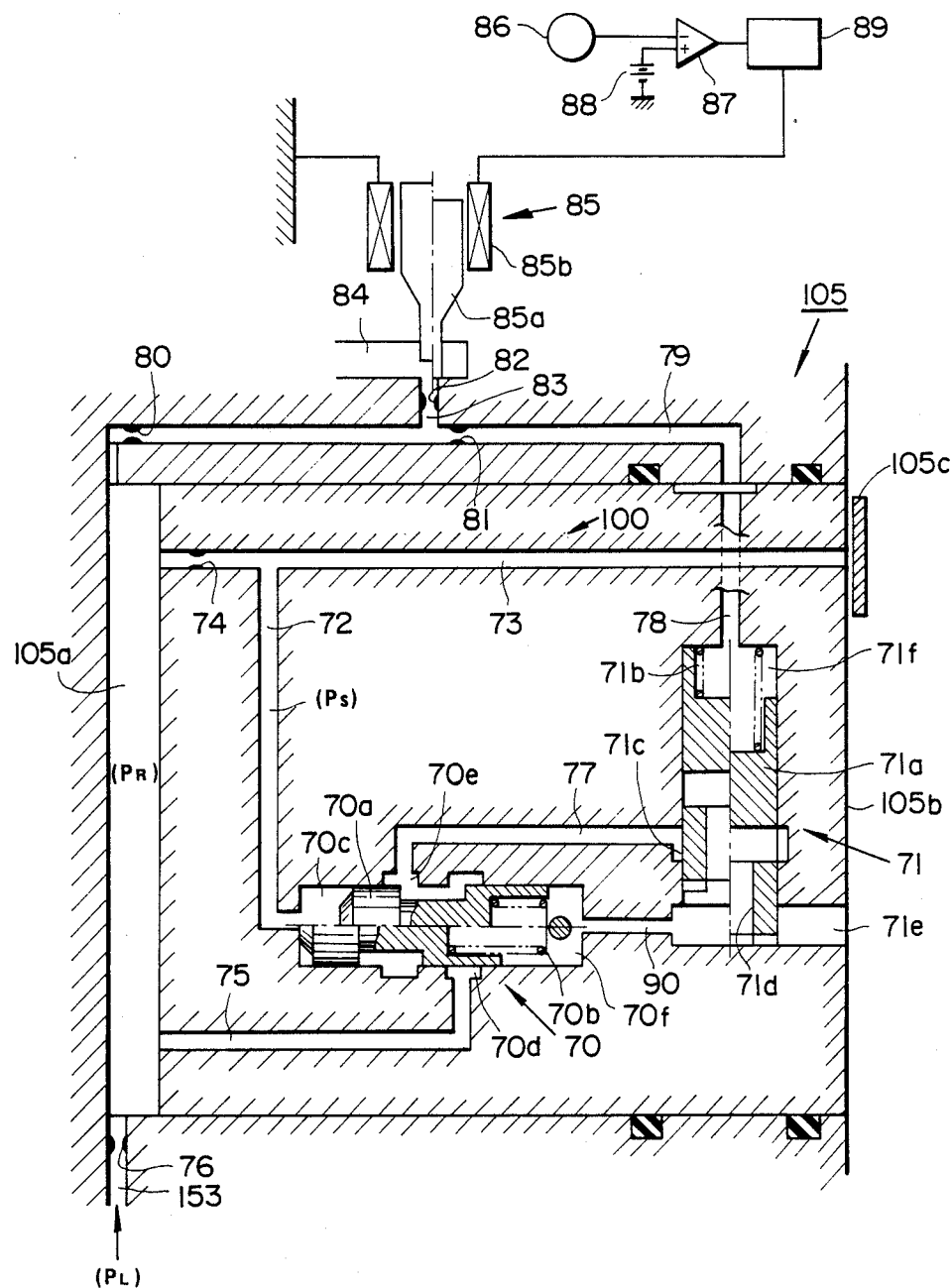
FIG. 6 is a similar view to FIG. 3 illustrating a second embodiment.

Referring to FIG. 6, a second embodiment according to the present invention is described.

This embodiment is different from the previously described first embodiment illustrated mainly in FIG. 3 in that a chamber 71f receiving a spring 71b is formed as a closed chamber. The closed chamber 71f is connected with a chamber 105a via a circuit 78 formed through a clutch piston 105b and another circuit 79 formed through a clutch housing. The circuit 79 is provided with orifices 80 and 81 which define therebetween a section from which a branch passage 83 extends. The branch passage 83 is provided with an orifice 82. Connected to the opposite end of the branch passage 83 is a drain circuit 84. There is provided at the junction of the branch passage 83 with the drain circuit 84 a solenboid valve 85 so as to close the port at which the branch passage 83 opens to the drain circuit 84 via the orifice 82. The solenoid valve 85 isolates the branch passage 83 from the drain circuit 84 when a plunger 85a thereof assumes a position as illustrated by the right half thereof owing to the bias of the solenoid 85b, whereas when solenoid 85b is not energized, the plunger 85a assumes a position as illustrated by the left half thereof where the pressure is related via the branch passage 83 and the drain circuit 84. The solenoid 85b is ON/OFF controlled in response to a signal from an engine coolant temperature sensor 86. The sensor output is connected with one input terminal of a comparator 87 whose other input is connected with a reference electric voltage source 88. An output terminal of the comparator 87 is connected via an amplifier 89 with the solenoid 85b. The sensor 86 generates an electric voltage which increases in proportion to coolant temperature. The reference electric voltage source 88 provides a reference indicative of a coolant temperature indicative of the completion of warming-up operation of an engine.

The second embodiment operates as follows: When the engine is warming up, the comparator 87 generates a High level signal and feeds it via the amplifier 89 to the solenoid 85b thereby to it energize. The energization of the solenoid 85d causes the plunger 85a to isolate the branch passage 83 from the drain circuit 84, thus allowing the same pressure as in the chamber 105a to build up in the chamber 71f, thus applying a downward force, as viewed in FIG. 6, onto the spool 71a in assisting the force by the spring 71b. Thus, the start-up detecting valve 71 can continue to establish communication of a circuit 77 with a drain port 71e until the torque converter output shaft revolution speed increases further above the before mentioned predetermined value 900 rpm. It follows that the vehicle does not move off from a standstill until the torque converter output revolution speed is elevated to a relatively high level which is high enough to cause the vehicle to move off from a standstill even when the engine revolution is instable during warm-up operation. After completion of warming-up of the engine, the comparator 87 switches its output to Low level, thus deenergizing the solenoid 85b. The deenergization of the solenoid 85b causes the pressure within the circuit 79 to be drained via the drain circuit 84, causing the pressure within the chamber 71f to disappear. Under this condition, the start-up detecting valve 71 works in the same manner as in the illustrated embodiment in FIG. 3 and thus the vehicle can move off from a standstill when torque converter revolution speed reaches the predetermined level of 900 rpm.

Figure 7:
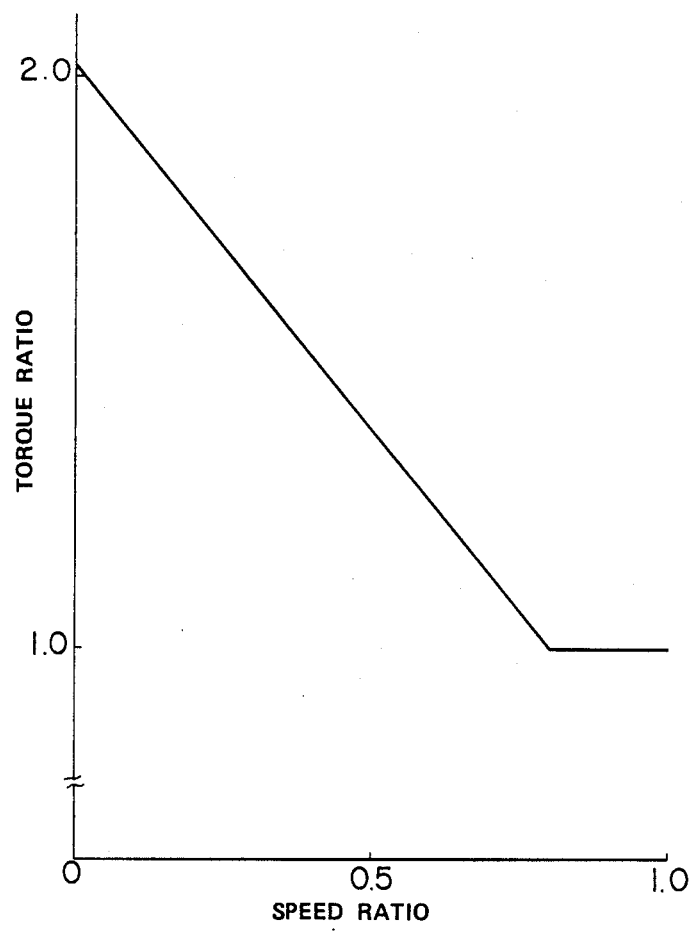
FIG. 7 shows characteristics of a torque converter.

In the first embodiment shown in FIG. 3 and the second embodiment shown in FIG. 6, the predetermined value which is reached by the torque converter output revolution speed when the start-up detection valve determines start-up is constant (i.e., 900 rpm) even if engine load condition differs at start-up. In these cases, a speed ratio between the engine and the torque converter output shaft is large and thus a corresponding torque ratio provided by a torque converter that has performance characteristics as shown in FIG. 7 is inevitably small. Therefore, the torque multiplication function of the torque converter can not be used to its full advantage at the time of start-up, thus causing a problem that a sufficiently rapid start-up of the vehicle cannot be expected even when the driver intends so by depressing the accelerator pedal to give large throttle opening degree (i.e., engine load).

Figure 8:
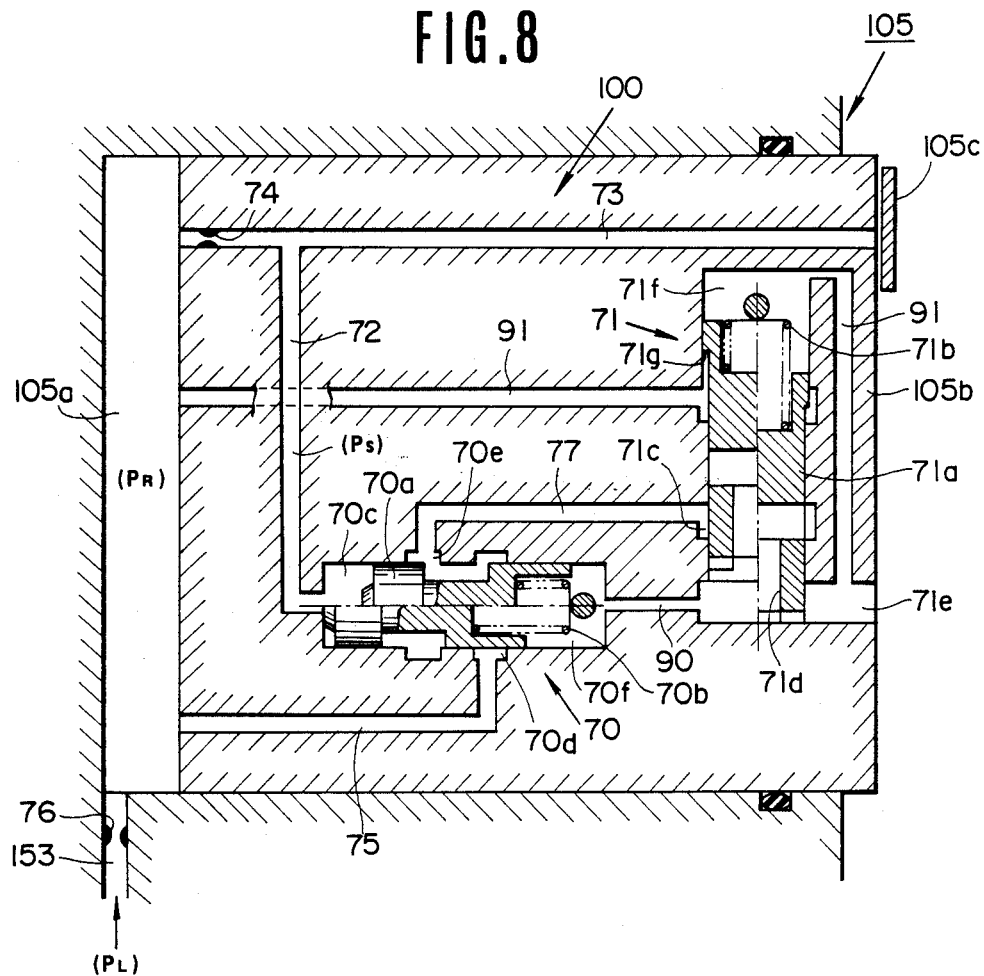
FIG. 8 is a similar view to FIG. 3 illustrating a third embodiment.

FIG. 8 shows a third embodiment which in order to solve this problem, a predetermined torque converter revolution speed at which a start-up detecting valve 71 isolates a circuit 77 from a drain port 71e is made variable such that it is high with small throttle opening degrees, but it is low with large throttle opening degrees. This third embodiment is subsuantially similar to the second embodiment shown in FIG. 6 except that a spool 71a of the start-up detecting valve 71 is formed with a pressure acting differential area 71g having a pressure acting area $S_1$ and a throttle opening degree representative pressure is admitted to this differential area 71g so as to produce a force $F_P$ applied to the spool 71a in an upward direction opposing to the force of a spring 71b. In this embodiment, a rear clutch pressure $P_R$ is admitted to the differential area 71g via a circuit 91. The force $F_P$ is therefore expressed by the equation $F_P = S_1 \times P_R$.

Figure 9:
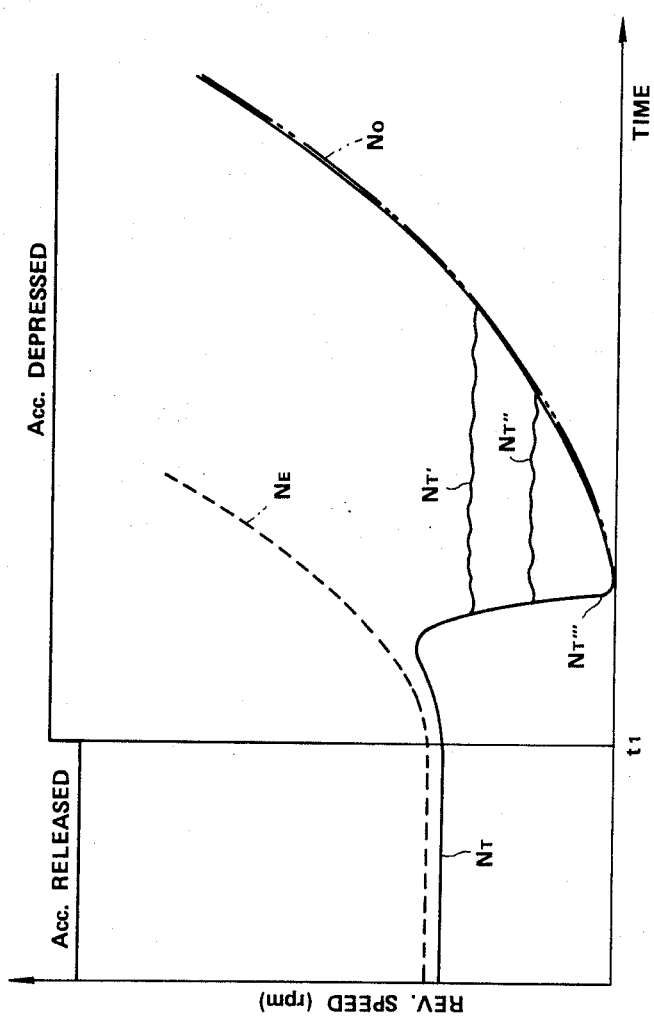
FIG. 9 is a time chart for the third embodiment.

The equlibrium state for the spool 71a can be expressed as follows:

$$F_C + F_P = F_K,$$

where: $F_C$ represents a centrifugal force, and $F_K$ a bias force by spring 71b. Since $F_C$ is proportional to $N_T^2$, thus $N_T$ is proportional to $\sqrt{Fc} = \sqrt{Fk - (P_R \cdot S_1)}$. From this relationship, it will be understood that a predetermined torque converter revolution speed value at which the start-up detecting valve switches is determined by the rear clutch pressure $P_R$. It is to be noted that since the rear clutch pressure $P_R$ is given by the line pressure $P_L$ and this line pressure $P_L$ increases with an increase in throttle opening degree, the rear clutch pressure $P_R$ rises as the throttle opening degree increases. The predetermined torque converter output revolution speed at which the start-up detecting valve 71 switches decreases $N_T'$ $N_T''$, $N_T'''$ as the throttle opening degree increases as illustrated in FIG. 9. Thus, a large start-up torque is produced as the throttle opening degree increases because the speed ratio decreases to cause the torque ratio to increase.

Therefore, according to the third embodiment, a start-up torque matching the throttle opening degree has been provided. It follows that with a small throttle opening degree, a slow start-up without any shock is provided, whereas with a large throttle opening degree, a rapid start-up with a large start-up torque is provided.

Although in the third embodiment, the rear clutch pressure $P_R$ has been used as representing the throttle opening degree, a throttle pressure which is directly proportional to the throttle opening degree may be used. If combining the idea of the second embodiment shown in FIG. 6, the predetermined torque converter output revolution speed $N_T'$, $N_T''$, $N_T'''$ may be made variable also with engine warming-up conditions without any difficulty.

Figure 10:
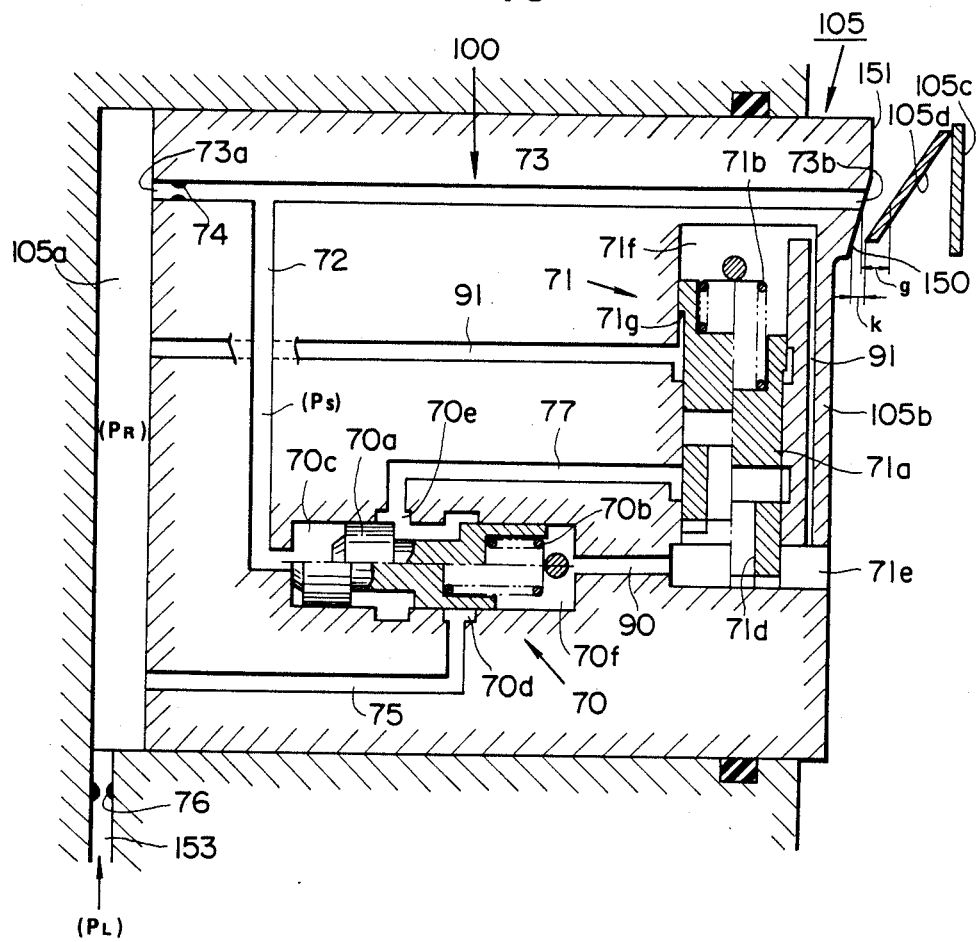
FIG. 10 is a similar view to FIG. 8 illustrating a fourth embodiment.

Referring to FIG. 10, a fourth embodiment according to the present invention is described. Comparing with FIG. 8, it will be noted that this fourth embodiment is substantially similar to the previously described embodiment shown in FIG. 8. In the case of the embodiment shown in FIG. 8, the clutch is held in the so-called about-to-engage state in order to prevent the vehicle from creeping. When the clutch is maintained in the about-to-engage state, the torque converter output revolution speed is maintained substantially as high as the engine revolution speed. The fourth embodiment shown in FIG. 10 is different from the third embodiment shown in FIG. 8 in that the clutch is maintained in a so-called slightly-engaged state when the vehicle is at a standstill during creep preventing operation. When the clutch is in the slightly-engaged state, the torque converter output revolution speed is held at a relatively low level. This is advantageous in alleviating shocks when the clutch shifts to firmly engaged state because the level of the torque converter output revolution speed in the slightly-engaged state is already set low and thus a drop in the torque conveter output revolution speed during the shift is small. This difference is attributed to the fact that as best shown in FIGS. 11(A) to 11(D), a belleville spring (or an initially coned disc spring) 105d interposed between a clutch piston 105b and the adjacent one clutch plate 105c of interleaved clutch plates serves as a valve element to close one end 73b of a connecting hole 73.

Figure 11A:
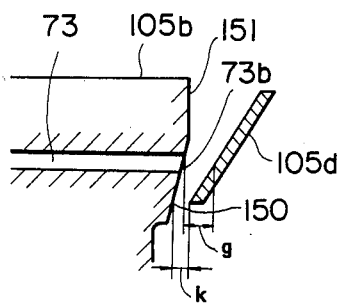
FIGS. 11(A), 11(B), 11(C) and 11(D) are diagrams illustrating various operative positions assumed by the fourth embodiment.
Figure 11B:
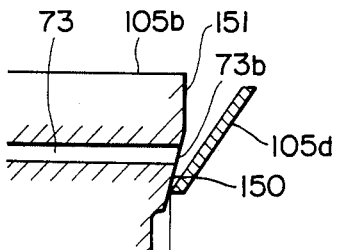
Figure 11C:
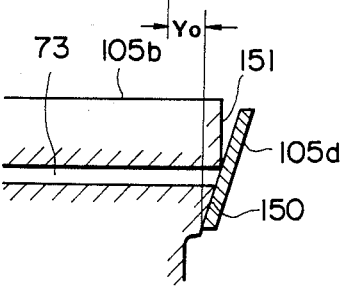
Figure 11D:
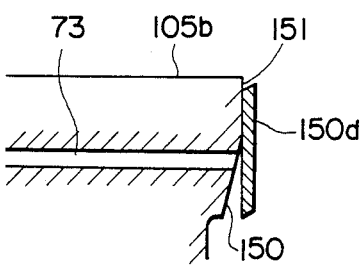

Referring to FIG. 10, the clutch piston 105b is formed with an inclined surface 105 adapted to engage an inner circumferential portion of the belleville spring 105d. Within this inclined surface 150, the end 73b of the connecting hole 73 is disposed so that the end 73b is closed when the inclined surface 105 is engaged by the inner circumferential portion of the belleville spring 105d as shown in FIG. 11(C). A cone angle of the inclined surface 150 is set slightly smaller than an angle of cone of the belleville spring 105d when it is in its initially coned disc shape as best seen in FIGS. 11(A). The inclined surface is connected with an end surface portion 151 which is disposed above, as viewed in FIG. 10, the inclined surface 105 and not inclined. In other words, this surface 151 is flat surface parallel to the clutch plate 105c.

The operation of the fourth embodiment is hereinafter described referring also to FIGS. 11(A), 11(B), 11(C) and 11(D).

When the vehicle is at a standstill, shifting a manual selector valve 130 (see FIG. 2B) from N range to D range causes line pressure $P_L$ to appear in a circuit 153 as mentioned in connection with the previously mentioned embodiments, thus causing rear clutch pressure $P_R$ to build up in a chamber 105a. Initially, a piston 105b of a rear clutch 105 is biased to assume the illustrated position in FIG. 10 by a return spring (not shown). In the illustrated position shown in FIG. 10, a backlash k exists and thus a clearance or a gap g between the open end 73b disposed in the inclined surface 150 and the belleville spring 105d is maximum. In this state, the opening degree of the open end 73b that is determined by the clearance g is larger than that of an orifice 74 provided near an opposite end 73a of the connecting hole 73, and thus the control pressure $P_S$ is zero. Thus, the spool 70a assumes a spring set position as illustrated by the lower half thereof in FIG. 10 where a circuit 75 is isolated from a circuit 77 which is connected with a drain port 71e via a start-up detecting valve 71 when a spool 71a of the latter assumes a position as illustrated by the right half thereof. Since there is no drainage of the rear clutch pressure $P_R$, the rear clutch pressure $P_R$ increases. This increase in the rear clutch pressure $P_R$ causes rightward, as viewed in FIG. 10, movement of the piston 105b from the illustrated position in FIGS. 10 and 11(A) to a position as illustrated in FIG. 11(B) where the rear clutch 105 assumes an about-to-engage state. In this state, the inclined surface 150 is brought into contact with the belleville spring 105d and thus the backlash k disappears as shown in FIG. 11(B).

Further rightward movement of the piston 105b beyond the illustrated position in FIG. 11(B) is possible because although the opening degree of the open end 73b determined by the clearance g becomes smaller than that of the orifice 74, the control pressure $P_S$ is still not high enough to move the spool 70a from the spring set position to a position as illustrated by the upper half thereof as viewed in FIG. 10 and thus the rear clutch pressure $P_R$ keeps rising. The further rightward movement of the piston 105b toward the position as illustrated in FIG. 11(C) causes the belleville spring 105d to flex. When the piston 105b assumes the position as illustrated in FIG. 11(C) where the amount of flexure of the belleville spring 105d is Yo and the open end 73b is completely closed, i.e., the opening degree of the open end is zero, resulting in a rapid increase in the control pressure $P_S$. In response to this increase in the control pressure $P_S$, the spool 70a is moved against a spring 70b to the position as illustrated by the upper half thereof where the circuit 75 is brought into communication with the circuit 77 via ports 70d and 70e. Since when the engine idles, the spool 71a of the start-up detecting valve 71 assumes the position as illustrated by the right half thereof in FIG. 10, a portion of the rear clutch pressure $P_R$ within the chamber 105a begins to be discharged via the circuit 75, port 70d, port 70e, circuit 77, port 71c, bore 71d and drain port 71e. This drop in the rear clutch pressure $P_R$ allows return movement of the piston 105b under the action of the return spring (not shown), thus opening the open end 73b to cause a drop in the control pressure $P_S$, thus allowing the return movement of the spool 70a under the action of the spring 70b, causing an increase in the rear clutch pressure $P_R$ which causes the rightward movement of the spool 105b.

After repeating the above proccess, the piston 105b assumes an equlibrium state as illustrated in FIG. 11(C) by flexing the belleville spring 105d by the amount Yo. In this state, the rear clutch 105 is slightly engaged due to the reaction force corresponding to the flexure amount Yo of the belleville spring 105d. This slightly-engaged state causes a drop in the torque converter output revolution speed because the rotating piston 105b is braked by the friction plate 105c held stationary when the vehicle is at a standstill.

Figure 12:
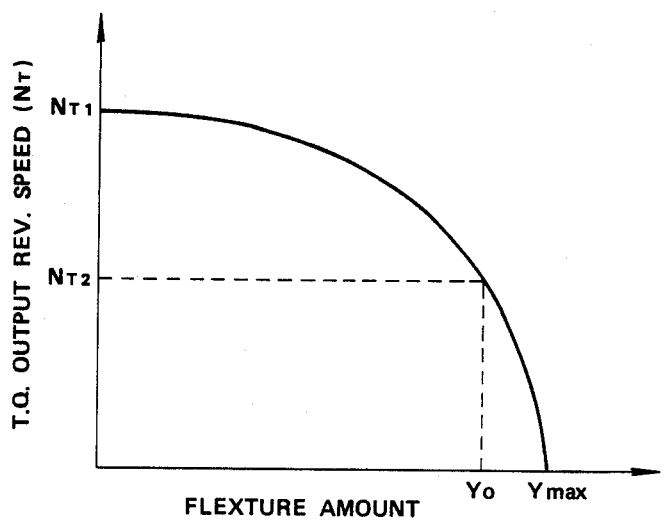
FIG. 12 shows variation in torque converter output revolution speed ($N_T$) versus flexture amount (Y) of belleville spring.

Hereinafter, a description is made how the angle of the inclined surface 150 is determined. Referring to FIG. 12, the relationship of torque converter output revolution speed ($N_T$) with the flexure amount of the belleville spring 150 is illustrated in the case of the torque converter 1 used in this embodiment. In this graph, the torque converter output revolution speed $N_T$ is $N_{T1}$ which is substantially equal to the engine revolution speed when Y=0, i.e., when the rear clutch 105 is prior to engagement. When Y=Ymax, i.e., when the clutch is completely engaged, the torque converter output revolution speed $N_T$ becomes zero (stall state). In determining the predetermined flexure amount Yo (see FIG. 11(C)), a lower limit value $N_{T2}$ in the torque converter revolution speed is determined and then the flexure amount corresponding to this lower limit valve $N_T$ is set as the predetermined flexure amount Yo. The angle of the inclined surface 150 is determined so that the predetermined flexure angle Yo is provided when the piston 105b assumes the relationship as illustrated in FIG. 11(C).

With the angle of the inclined surface 150 set in the above mentioned manner, the torque converter output revolution speed is prevented from dropping below the value $N_{T2}$. Besides, since during this creep preventive operation the toprque converter output revolution is maintained at the value $N_{T2}$ which is considerably lower than the value $N_T$ as high as the engine revolution speed, the vehicle start-up can be carried out without any substantial shocks and any delay.

When, with an intention to start the vehicle, the accelerator pedal is depressed to cause an increase in an engine revolution speed and in turn an increase in revolution speed of the piston 105b, the spool 71a is shifted from the position as illustrated by the right half thereof to the position as illustrated by the left half thereof owing to the corresponding increase in centrifugal force. The communication between the circuit 77 with the drain port 71e is shut off when the spool 71a assumes the position as illustrated by the left half thereof. From the instant when the spool 71a has assumed the position as illustrated by the left half thereof, a further increase in the rear clutch pressure $P_R$ upto the level of the line pressure $P_L$ begin. since the line pressure related to the throttle opening degree is applied to the spool 71a via the circuit 91 in the same manner as in the third embodiment shown in FIG. 8, the above further increase in the rear clutch pressure $P_R$ starts earlier when the throttle opening degree is large than is does when the throttle opening degree is small. This further increase in the rear clutch pressure $P_R$ causes rightward movement of the piston 105b from the position illustrated in FIG. 11(C) to the position illustrated in FIG. 11(D) where the end surface 151 of the piston 105b flexes the belleville spring 105d until the latter is flattened and stongly urges the clutch plates 105c to firmly engage with each other, thus enabling the vehicle to move off from a standstill. Since this start-up operation is carried out by shifting from the slightly-engaged state to the firmly or completely engaged state, the start-up operation can be effected without any delay and without any substantial shocks that are caused due to racing of the engine.

What is claimed is:

1. A creep preventive arrangement for an automatic transmission having a torque converter including an output rotatable at a torque converter output revolution speed, comprising;

a friction engagement element having a member rotatable with the output of the torque converter and a fluid chamber, said member being movable responsive to fluid pressure in said fluid chamber from a released position to a firmly engaged position through a predetermined creep preventive position as the fluid pressure in said fluid chamber increases;

a start-up pressure regulating means in fluid communication with said fluid chamber for discharging fluid from said fluid chamber to cause a drop in the fluid pressure in said fluid chamber responsive to said member having moved to said predetermined creep preventive position so as to prevent further increase in the fluid pressure in said fluid chamber; and means in communication with said start-up pressure regulating means and responsive to the torque converter output revolution speed for prohibiting said start-up pressure regulating means from discharging fluid from said fluid chamber when the torque converter output revolution speed exceeds a predetermined value thereby to permit further increase in the fluid pressure in said fluid chamber to urge said member to move beyond said predetermined creep preventive position to said firmly engaged position.

2. A creep preventive arrangement as claimed in claim 1, wherein said friction engagement element is a start-up clutch to be engaged when the automatic transmission is set in a predetermined drive range.

3. A creep preventive arrangement as claimed in claim 2, wherein said start-up clutch includes a rear clutch which is to be engaged when the automatic transmission is set in a forward automatic drive range and a front clutch to be engaged when the transmission is set in a reverse drive range.

4. A creep preventive arrangement as claimed in claim 1, wherein said friction engagement element has a friction plate assembly and said member is a piston having one end portion to be brought into contact with the adjacent one friction plate of said friction plate assembly when said piston assumes said predetermined creep preventive position, and wherein said start-up pressure regulating means includes an opening formed within said end portion of said piston to be closed by said adjacent one friction plate when said end portion is brought into contact with said adjacent one friction plate, and also includes a start-up pressure regulating valve having a first port communicating with said fluid chamber and a second port communicating with a drain aperture, and a spool with means for moving said spool responsive to the closure of said opening from a first position where said first port is isolated from said second port to a second position where said first port in brought into communication with said second port.

5. A creep preventive arrangement as claimed in claim 4, wherein said start-up pressure regulating valve has a signal fluid pressure chamber communicating on one hand with said opening and on the other hand with said fluid pressure chamber via an orifice, and a spring biasing said spool thereof toward the first position thereof against signal fluid pressure within said signal fluid pressure chamber.

6. A creep preventive arrangement as claimed in claim 4, wherein said friction engagement element has a return spring biasing said piston against the fluid pressure in said fluid chamber.

7. A creep preventive arrangement as claimed in claim 4, wherein said prohibiting means includes a start-up detecting valve including a spool movable responsive to a centrifugal force due to rotation of said piston about its own axis, said spool being movable from a first position where said second port of said start-up pressure regulating valve is allowed to communicate with said drain aperture to a second position where said second port of said start-up pressure regulating valve is isolated from said drain pressure.

8. A creep preventive arrangement as claimed in claim 7, wherein said prohibiting means includes means for restraining movement of said spool of said start-up detecting valve.

9. A creep preventative arrangement as claimed in claim 8, wherein said fluid chamber of said friction engagement element communicates via an orifice with a manual selector valve of the automatic transmission.

10. A creep preventive arrangement as claimed in claim 9, wherein said end portion of said piston is cylindrical and said drain aperture is disposed radially inwardly of said end portion of said piston so that rotation of said piston causes fluid from said drain aperture to thrown radially outwardly toward said friction plate assembly.

11. A creep preventive arrangement as claimed in claim 8, wherein said restraining means includes a spring biasing said spool of said start-up detecting valve toward said first position thereof.

12. A creep preventative arrangement as claimed in claim 11, wherein said start-up pressure regulating valve is built in said piston with said spool thereof arranged axially parallel to the axis of rotation of said piston.

13. A creep preventive arrangement as claimed in claim 11, wherein said start-up detecting valve is built in said piston with said spool thereof arranged radially with respect to rotation of said piston.

14. A creep preventive arrangement as claimed in claim 8, wherein said restraining means includes a spring accommodating fluid chamber to which said spool of said start-up detecting valve is exposed, a spring within said spring accommodating chamber biasing said spool of said start-up detecting valve toward said first position thereof, means for detecting engine warming-up operation and means responsive to said detecting means for applying fluid pressure to said spring accommodating fluid chamber when the engine warming-up operating is detected.

15. A creep preventive arrangement as claimed in claim 14, wherein said start-up pressure regulating valve is built in said piston with said spool thereof arranged axially parallel the axis of rotation of said piston.

16. A creep preventive arrangement as claimed in claim 14, wherein said start-up detecting valve is built in said piston with said spool thereof arranged radially with respect to rotation of said piston.

17. A creep preventive arrangement as claimed in claim 11, wherein said restraining means includes a differential pressure acting area formed in said spool of said start-up pressure regulating valve and means for applying a signal fluid pressure variable with engine load, said spool of said start-up detecting valve being urged against said spring thereof in response to said signal fluid pressure applied thereto.

18. A creep preventative arrangement as claimed in claim 17, wherein the fluid pressure within said fluid chamber of said friction element is used as said signal fluid pressure applied to said differential pressure acting area formed in said spool of said start-up detecting valve.

19. A creep preventive arrangement as claimed in claim 18, wherein said start-up pressure regulating valve is built in said piston with said spool thereof arranged axially parallel to the axis of rotation of said piston.

20. A creep preventative arrangement as claimed in claim 18, wherein said start-up detecting valve is built in said piston with said spool thereof arranged radially with respect to rotation of said piston.

21. A creep preventative arrangement as claimed in claim 1, wherein said member is a piston having one end portion, said friction engagement element has a friction plate assembly and a belleville spring between said friction plate assembly and said one end portion with a cone surface thereof facing said one end portion of said piston, said one end portion of said piston being pressed against said belleville spring to flex the same to bring said friction plate assembly into firm engagement when said piston assumes said firmly engaged position, said end portion of said piston including an inclined surface section and a flat surface section, said inclined surface section being pressured against said cone surface of said belleville spring to flex the same to a predetermined flexure amount to bring said clutch plate assembly into a predetermined slightly engaged state when said piston assumes said predetermined creep preventive position.

22. A creep preventative arrangement as claimed in claim 21, wherein said start-up pressure regulating means includes an opening formed within said inclined surface section of said one end portion of said piston to be closed by said cone surface of said belleville spring when said piston assumes said predetermined creep preventive position and a start-up pressure regulating valve having a first port communicating with said fluid chamber and a second port communicating with a drain aperture, and a spool with means, for moving said spool responsive to the closure of said opening from a first position where said first port is isolated from said second port to a second position where said first port is brought into communication with said second port.

23. A creep preventative arrangement as claimed in claim 22, wherein said start-up pressure regulating valve has a signal fluid pressure chamber communicating on one hand with said opening and on another hand with said fluid pressure chamber via an orifice, and a spring biasing said spool thereof toward the first position thereof against signal fluid pressure within said signal fluid pressure chamber.

24. A creep preventative arrangement as claimed in claim 22, wherein said belleville spring biases said piston against the fluid pressure within said fluid chamber.

25. A creep preventive arrangement as claimed in claim 22, wherein said prohibiting means includes a start-up detecting valve including a spool movable responsive to a centrifugal force due to rotation of said piston about its own axis, said spool being movable from a first position where said second port of said startup pressure regulating valve is allowed to communicate with said drain aperture to a second position where said second port of said start-up pressure regulating valve is isolated from said drain aperture.

26. A creep preventative arrangement as claimed 25, wherein said prohibiting means includes means for restraining movement of said spool of said start-up detecting valve.

27. A creep preventative arrangement as claimed in claim 26, wherein said restraining means includes a spring biasing said spool of said start-up detecting valve toward said first position thereof.

28. A creep preventative arrangement as claimed in claim 27, wherein said restraining means includes a differential pressure acting area formed in said spool of said start-up detecting valve and means for applying a signal fluid pressure variable with engine load, said spool of said start-up detecting valve being urged against said spring thereof in response to said signal fluid pressure applied thereto.

29. A creep preventive arrangement as claimed in claim 28, wherein the fluid pressure within said fluid chamber of said friction engagement element is used as said signal fluid pressure applied to said differential pressure acting area formed in said spool of said start-up detecting valve.

30. A creep preventive arrangement as claimed in claim 29, wherein said start-up pressure regulating valve is built in said piston with said spool thereof arranged axially parallel to the axis of rotation of said piston.

31. A creep preventative arrangement as claimed in claim 30, wherein said start-up detecting valve is built in said piston within said spool thereof arranged radially with respect to rotation of said piston.

* * * * *